US008429958B2

(12) United States Patent
Saito et al.

(10) Patent No.: US 8,429,958 B2
(45) Date of Patent: Apr. 30, 2013

(54) APPARATUS AND METHOD FOR MONITORING SLIDING STATE OF PISTON

(75) Inventors: Yoshiyuki Saito, Tokyo (JP); Kouji Moriyama, Aioi (JP)

(73) Assignee: IHI Corporation (JP)

( * ) Notice: Subject to any disclaimer, the term of this patent is extended or adjusted under 35 U.S.C. 154(b) by 0 days.

(21) Appl. No.: 13/000,781

(22) PCT Filed: Jun. 23, 2009

(86) PCT No.: PCT/JP2009/061394
§ 371 (c)(1),
(2), (4) Date: Dec. 22, 2010

(87) PCT Pub. No.: WO2009/157436
PCT Pub. Date: Dec. 30, 2009

(65) Prior Publication Data
US 2011/0113873 A1     May 19, 2011

(30) Foreign Application Priority Data
Jun. 24, 2008   (JP) .................................. 2008-165101

(51) Int. Cl.
*G01M 15/04*     (2006.01)
(52) U.S. Cl.
USPC ........................................................ 73/114.78
(58) Field of Classification Search ................ 73/114.78
See application file for complete search history.

(56) References Cited

U.S. PATENT DOCUMENTS

| | | | | |
|---|---|---|---|---|
| 4,143,319 A | * | 3/1979 | Rouam | 324/219 |
| 4,711,120 A | * | 12/1987 | Kwun et al. | 73/114.77 |
| 4,854,162 A | * | 8/1989 | Yerace et al. | 73/114.81 |
| 4,884,434 A | * | 12/1989 | Satake et al. | 73/7 |
| 4,987,774 A | * | 1/1991 | De Waal | 73/114.78 |
| 5,007,284 A | * | 4/1991 | Slone | 73/114.78 |
| 5,675,076 A | * | 10/1997 | Esch et al. | 73/114.77 |
| 6,318,147 B1 | * | 11/2001 | Steinruck et al. | 73/7 |
| 6,688,263 B1 | * | 2/2004 | Yamamoto et al. | 123/41.57 |
| 7,549,326 B2 | * | 6/2009 | Cummings et al. | 73/114.77 |
| 2008/0202203 A1 | * | 8/2008 | Cummings et al. | 73/9 |

FOREIGN PATENT DOCUMENTS

JP    63-170507    11/1988
(Continued)

OTHER PUBLICATIONS

International Search Report mailed Aug. 11, 2009 in corresponding PCT International Application No. PCT/JP2009/061394.
Office Action dated Aug. 17, 2012 issued in corresponding Korean Patent Application No. 10-2010-7028711 with English translation (6 pages).

(Continued)

*Primary Examiner* — Freddie Kirkland, III
(74) *Attorney, Agent, or Firm* — Ostrolenk Faber LLP (57) ABSTRACT

The present invention is an apparatus and a method for monitoring a sliding state of a piston ring. The present invention detects a cycle of rotation of a piston ring based on a temperature at a predetermined site of a cylinder liner, and determines a sign of burning of a piston based on a state of the rotation. As a result, it is possible to detect a sign of burning of a piston by an apparatus less expensive than apparatuses using a conventional technique of detecting a capacitance.

8 Claims, 4 Drawing Sheets

FOREIGN PATENT DOCUMENTS

| | | |
|---|---|---|
| JP | 05-203439 | 8/1993 |
| JP | 6-026393 | 2/1994 |
| JP | 06026393 A * | 2/1994 |
| JP | 6-346789 | 12/1994 |
| JP | 06346789 A * | 12/1994 |
| JP | 2002-021629 | 1/2002 |
| JP | 2007-107947 | 4/2007 |
| KR | 2002-0015737 | 3/2002 |

OTHER PUBLICATIONS

Office Action dated Sep. 11, 2012 issued in corresponding Japanese Patent Application No. 2008-165101 with English translation (4 pages).

Japanese Notice of Allowance, dated Dec. 21, 2012, issued in corresponding Japanese Patent Application No. 2008-165101. Total 6 pages, including English Translation.

* cited by examiner

APPARATUS AND METHOD FOR MONITORING SLIDING STATE OF PISTON

CROSS-REFERENCE TO RELATED APPLICATIONS

The present application is a 35 U.S.C. §§371 national phase conversion of PCT/JP2009/061394, filed Jun. 23, 2009, which claims priority of Japanese Patent Application No. 2008-165101, filed Jun. 24, 2008, the contents of which are incorporated herein by reference. The PCT International Application was published in the Japanese language.

TECHNICAL FIELD

The present invention relates to an apparatus and a method for monitoring a sliding state of a piston ring.

BACKGROUND ART

Conventionally, in order to prevent burning of a piston in an engine during operation, there are attempts to measure a thickness of a film of lubricating oil. One of the methods of measuring a thickness of an oil film is a method of measuring a capacitance of a gap between a sliding surface of a piston ring in a cylinder liner and the piston ring by use of a detection electrode, which is provided on the sliding surface of the piston ring, and then calculating an oil thickness of a lubricating oil.

For example, as a prior art document that discloses a capacitance-detection-type film thickness measuring technique as described above, Patent Document 1 as shown below is set forth.

Patent Document 1: Japanese Unexamined Patent Application, First Publication No. 2007-107947

However, the aforementioned conventional technique requires an electronic circuit that, in order to measure the capacitance, is used for the purposes such as supplying charging electricity to the detection electrode, detecting the period of time for charging, and discharging the electricity charged in the detection electrode. This increases the cost of the apparatus.

Furthermore, the aforementioned technique requires that a through-hole be bored in the cylinder and cylinder liner by machining, and that a detection electrode be installed at a forward end portion (a sliding surface of the piston ring) of the through-hole. Therefore, the detection electrode is installed at much expense in time and effort. In addition, there is a possibility of an occurrence of combustion gas leakage through the through-hole. Consequently, there is a demand for development of a technique that detects a sign of burning of a piston by a less expensive and simpler method.

The present invention has been achieved in view of the aforementioned problems, and has objects as follows:
(1) To detect a sign of burning of a piston by use of an apparatus less expensive than conventional apparatuses.
(2) To detect a sign of burning of a piston by a method of installing a sensor simpler than conventional methods.

DISCLOSURE OF INVENTION

To achieve the above objects, the present invention adopts the following.

A first apparatus for monitoring a sliding state of a piston ring according to the present invention includes: a temperature sensor that detects a temperature at a predetermined site of a cylinder liner; a rotation sensor that detects a rotation of an engine; a temperature data collection portion that obtains, based on a detection result of the temperature sensor and a detection result of the rotation sensor, temperature data on the predetermined site when a piston ring passes; and a piston ring rotation state determination portion that detects a rotation of the piston ring based on the temperature data and determines a sign of burning of a piston based on a state of the rotation.

A second apparatus for monitoring a sliding state of a piston ring according to the present invention is the above first apparatus for monitoring a sliding state of a piston ring, including: a plurality of temperature sensors in a cross-section orthogonal to a reciprocating direction of the piston, in which the piston ring rotation state determination portion detects a rotation of the piston ring based on an average value of pieces of temperature data on the temperature sensors.

A third apparatus for monitoring a sliding state of a piston ring according to the present invention is the above second or third apparatus for monitoring a sliding state of a piston ring, in which the piston ring rotation state determination portion acquires a cycle of varying temperature based on the temperature data and detects the cycle as a cycle of rotation of the piston ring.

On the other hand, a first method for monitoring a sliding state of a piston ring includes: a temperature detection step of detecting a temperature at a predetermined site of a cylinder liner; an engine rotation detection step of detecting a rotation of an engine; a temperature data collection step of collecting, based on a detection result of the temperature and a detection result of the rotation, temperature data on a predetermined site when a piston ring passes the predetermined site; a piston ring rotation detection step of detecting a rotation of the piston ring based on the temperature data; and a determination step of determining a sign of burning of a piston based on a detection result of the rotation of the piston ring.

A second method for monitoring a sliding state of a piston ring according to the present invention is the above first method for monitoring a sliding state of a piston ring, in which the temperature detection step detects temperatures at a plurality of sites in a cross-section orthogonal to a reciprocating direction of the piston, the temperature data collection step acquires temperature data on the plurality of sites; and the piston ring rotation detection step detects a rotation of the piston ring based on an average value of the temperature data.

A third method for monitoring a sliding state of a piston ring according to the present invention is the above first or second method for monitoring a sliding state of a piston ring, in which the piston ring rotation detection step acquires a cycle of varying temperature based on the temperature data obtained in the temperature data collection step, and detects the cycle as a cycle of rotation of the piston ring.

According to the present invention, a rotation of a piston ring is detected based on a temperature at a predetermined site of the cylinder liner, and a sign of burning of a piston is determined based on a state of the rotation. Thereby, it is possible to detect a sign of burning of a piston by an apparatus less expensive than apparatuses using a conventional technique of detecting a capacitance.

BEST MODE FOR CARRYING OUT THE INVENTION

Hereunder is a description of one embodiment of the present invention with reference to the drawings.

Figure 1:
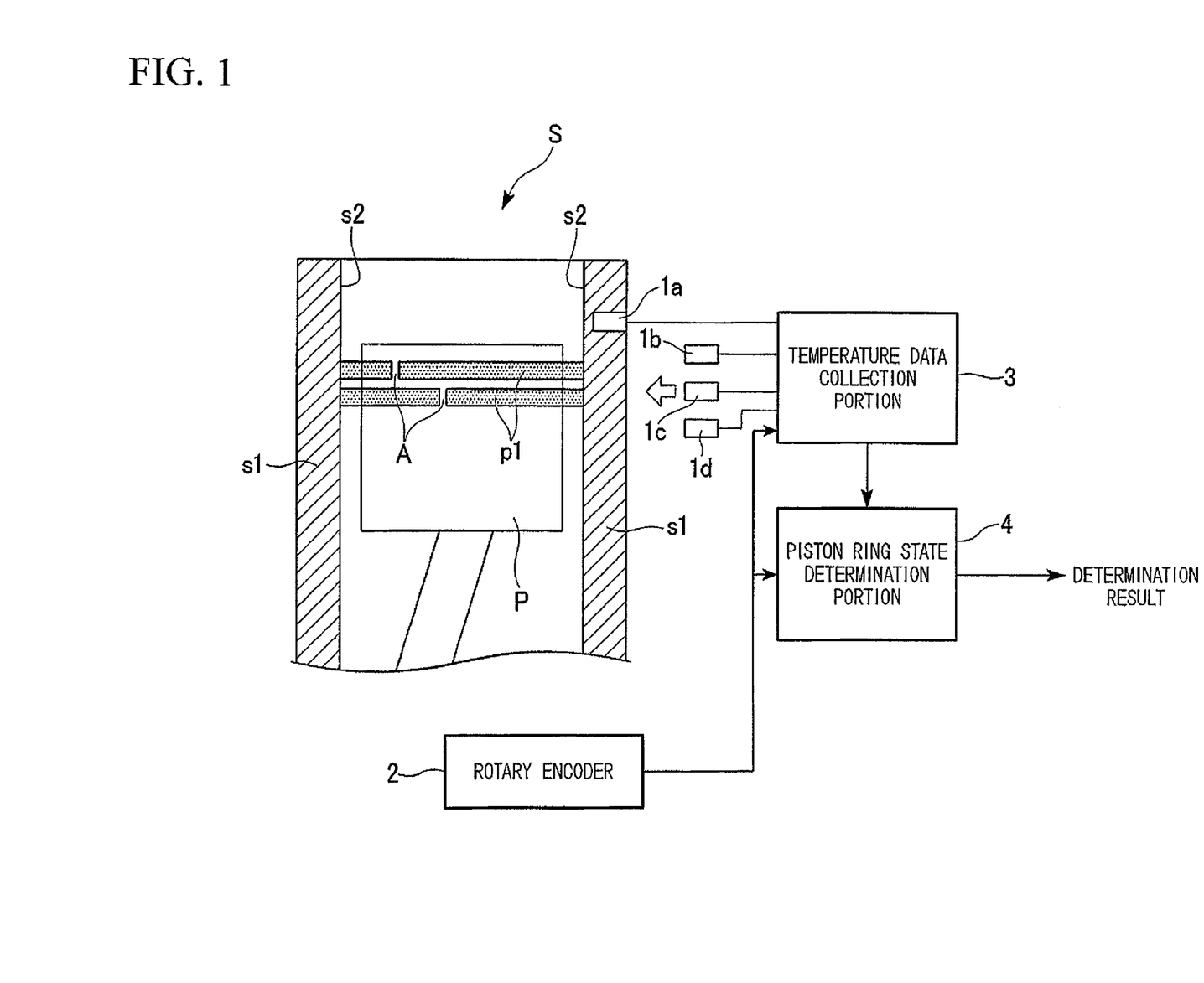
FIG. 1 is a block diagram showing a structure of an apparatus for monitoring a sliding state of a piston ring according to one embodiment of the present invention.

FIG. 1 is a block diagram showing a structure of an apparatus for monitoring a sliding state of a piston ring according to one embodiment of the present invention. The present apparatus for monitoring a sliding state of a piston ring includes: four temperature sensors 1a, 1b, 1c, and 1d; a rotary encoder 2; a temperature data collection portion 3; and a piston ring rotation state determination portion 4. As shown in the figure, the apparatus for monitoring a sliding state of a piston ring has an engine S as its monitoring target.

First, the engine S as the monitoring target will be described. The engine S has a known structure, in which a reciprocating piston P is contained with reciprocable in a cylinder liner s1 having a cylindrical shape. The piston P is a cylindrical member. A piston ring p1 fits into each groove formed in a circumferential surface of the piston P. The piston ring p1 is a metal member generally formed in a ring shape, a part of which is cut away from the necessity of being fit into the groove of the piston P. In the present specification, the cut-away portion in the piston ring p1 is referred to as a fitting clearance.

Of the constituent elements that constitute the present apparatus for monitoring a sliding state of a piston ring, the four temperature sensors 1a, 1b, 1c, and 1d and the rotary encoder 2 are previously provided in the engine S in order to control the engine S. That is, the four temperature sensors 1a, 1b, 1c, and 1d and the rotary encoder 2 are not additionally provided to detect a sliding state of the piston rings p1 provided on the piston P with respect to the cylinder liner s1 (to be more correct, a piston ring sliding surface s2 that is a surface of the cylinder liner s1).

The four temperature sensors 1a, 1b, 1c, and 1d are, for example, thermistors, thermocouples, or resistance thermometers. They are buried in the cylinder liner s1 at regular intervals in its circumferential direction. That is, the temperature sensors 1a, 1b, 1c, and 1d measure temperatures at four points in the circumferential direction of the cylinder liner s1, and output them to the temperature data collection portion 3.

Figure 2A:
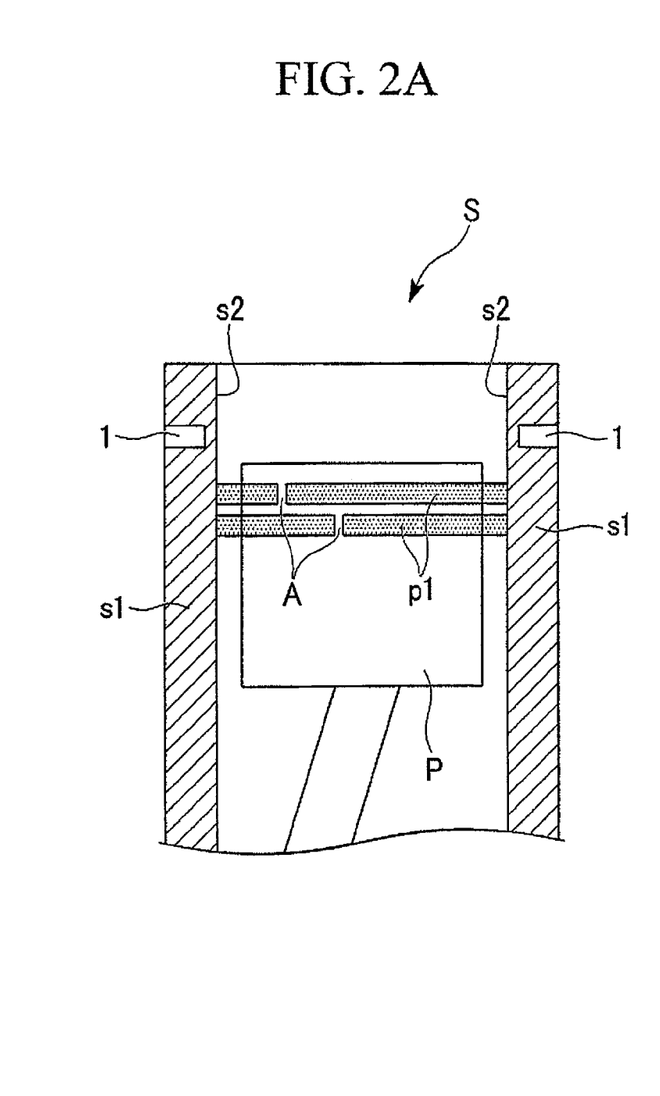
FIG. 2A is a cross-sectional view showing a positional relationship between an arrangement of temperature sensors 1a, 1b, 1c, and 1d and fitting clearances A of piston rings p1 in the embodiment of the present invention.
Figure 2B:
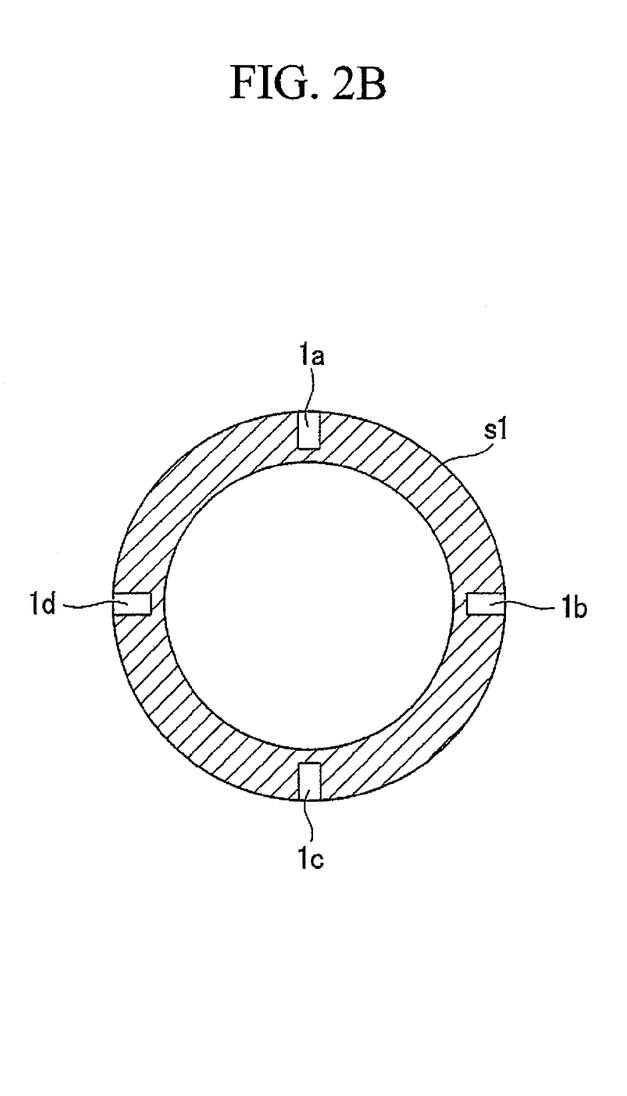
FIG. 2B is a cross-sectional view showing a positional relationship between an arrangement of temperature sensors 1a, 1b, 1c, and 1d and fitting clearances A of piston rings p1 in the embodiment of the present invention.

FIGS. 2A and 2B are cross-sectional views showing a positional relationship between an arrangement of the temperature sensors 1a, 1b, 1c, and 1d and the fitting clearances A of the piston rings p1. FIG. 2A shows a cross-section of the cylinder liner s1 in a direction parallel to the reciprocating direction of the piston P. FIG. 2B shows a cross-section of the cylinder liner s1 in a direction vertical to the reciprocating direction of the piston P. As shown in FIGS. 2A and 2B, the temperature sensors 1a, 1b, 1c, and 1d are arranged at four points (four points spaced 90° away from each other in the circumferential direction of the cylinder liner s1) in a predetermined orthogonal cross-section (arrangement cross-section) in the reciprocating direction of the piston P. The piston rings p1 provided on the piston P reciprocatingly passes the arrangement cross-section of the temperature sensors 1a, 1b, 1c, and 1d arranged as described above, with the reciprocating movement of the piston P in the cylinder liner s1.

The rotary encoder 2 is a rotation sensor that detects a rotation of the engine S. In a state where the engine S is in rotation (operation), the rotary encoder 2 outputs a pulse signal corresponding to the rotation state to the temperature data collection portion 3 and the piston ring rotation state determination portion 4. The pulse signal indicates an operational state of the engine S and also indicates a crank angle of the engine S, that is, a position of the piston P (a position of the piston ring p1) in its reciprocating movement.

Based on the pulse signal that is input from the rotary encoder 2, the temperature data collection portion 3 takes in and stores temperature detection signals that are input from the temperature sensors 1a, 1b, 1c, and 1d. That is, the temperature data collection portion 3 takes in, at the time when the piston ring p1 passes the aforementioned arrangement cross-section, the temperature detection signals that are input from the temperature sensors 1a, 1b, 1c, and 1d. Thereby, the temperature data collection portion 3 obtains a temperature of the cylinder liner s1 for each of the temperature sensors 1a, 1b, 1c, and 1d at the time when the piston ring p1 passes the arrangement cross-section, and then generates and stores (accumulates) data indicative of these temperatures (temperature data). Furthermore, the temperature data collection portion 3 supplies the temperature data to the piston ring rotation state determination portion 4 in response to the request from the piston ring rotation state determination portion 4.

Based on the temperature data and the pulse signal that is input from the rotary encoder 2, the piston ring rotation state determination portion 4 determines the rotation state of the piston ring p1 with the engine S being in operation. In the piston ring sliding surface s2, the portions that face the fitting clearances A are higher in temperature than the portions other than the fitting clearances A due to an influence of the combustion gas. Therefore, based on a difference in temperature between the fitting clearance portions and the portions other than the fitting clearances, the piston ring rotation state determination portion 4 determines the rotation state (for example, the number of rotations or the rotation speed) of the of the fitting clearances A, and outputs the determination result to an external engine control apparatus (not shown in the figure).

Next is a detailed description of an operation of the present apparatus for monitoring a sliding state of a piston ring with a structure as described above, with reference to FIG. 3 to FIG. 4.

When the engine S is set in operation, the piston P and the piston rings p1 reciprocate in the cylinder liner s1. The piston rings p1 reciprocate in the cylinder liner s1 while rotating about the piston P. That is, the piston rings p1 are attached to the piston P in a state of being fitted into ring-like grooves formed in the circumferential surface of the piston P, and hence are not completely fixed to the piston P. Therefore, the piston rings p1 rotate in a specified direction due to an influence of friction between the cylinder liner s1 and themselves or the like.

Figure 3:
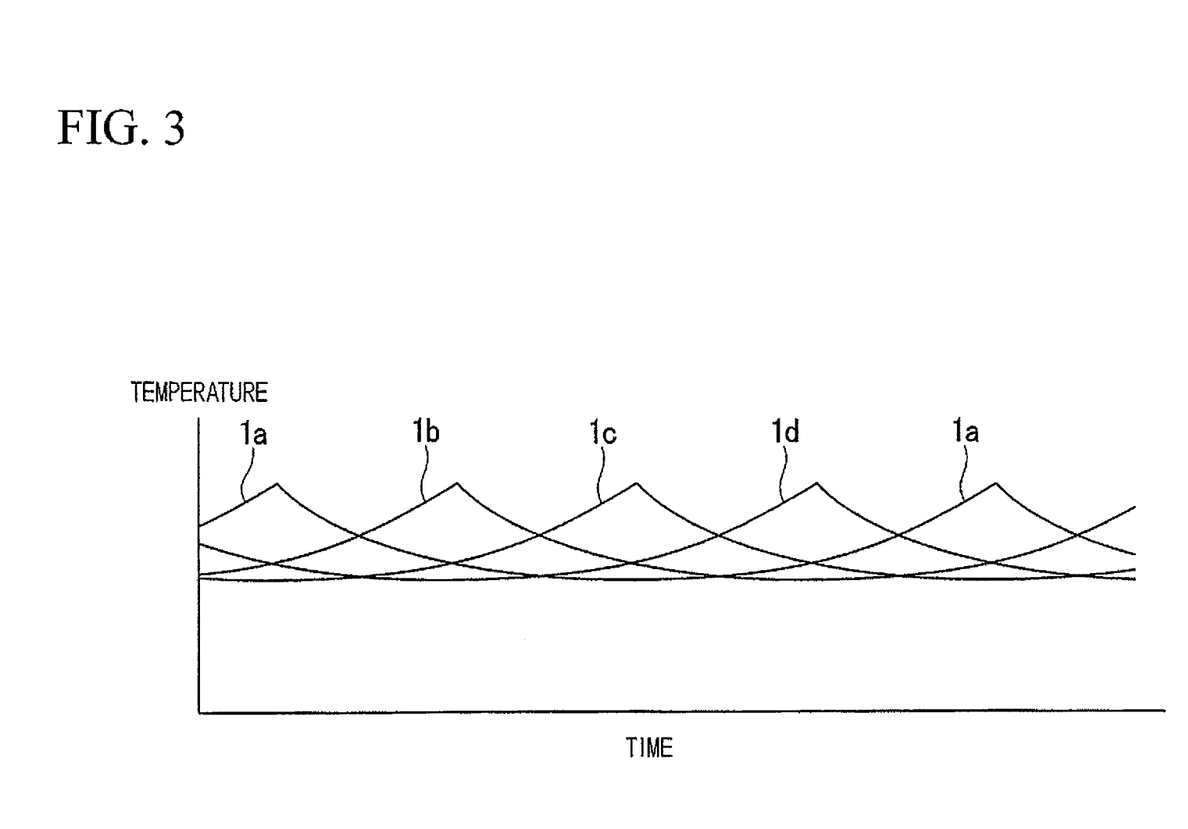
FIG. 3 is a diagram schematically showing changes in temperature measurement data detected by the temperature sensors in the embodiment of the present invention.

With the piston ring p1 rotating about the piston P, the fitting clearance A of the piston ring p1 rotates about the piston P accordingly. The temperature data collected by the temperature data collection portion 3 via the temperature sensors 1a, 1b, 1c, and 1d is as shown in FIG. 3. That is, because the fitting clearance A of the piston ring p1 rotates, the temperature sensors 1a, 1b, 1c, and 1d have a highest temperature when the fitting clearance A passes. Furthermore, because the temperature sensors 1a, 1b, 1c, and 1d are spaced at 90° from each other in the circumferential direction of the cylinder liner s1, the time at which the temperature is highest is different among the temperature sensors 1a, 1b, 1c, and 1d.

Furthermore, in a state where a lubricating effect by the lubricating oil is favorable, that is, in a state where an oil film with a proper thickness is formed between the piston ring p1 and the cylinder liner s1, the friction between the piston ring p1 and the cylinder liner s1 is favorably reduced. Therefore, because the piston ring p1 rotates with a substantially constant cycle of rotation, the detection cycle for the aforementioned highest temperature (that is, the cycle of rotation of the fitting clearance A) coincides with a substantially constant cycle of rotation similar to the cycle of rotation of the piston ring p1.

Figure 4:
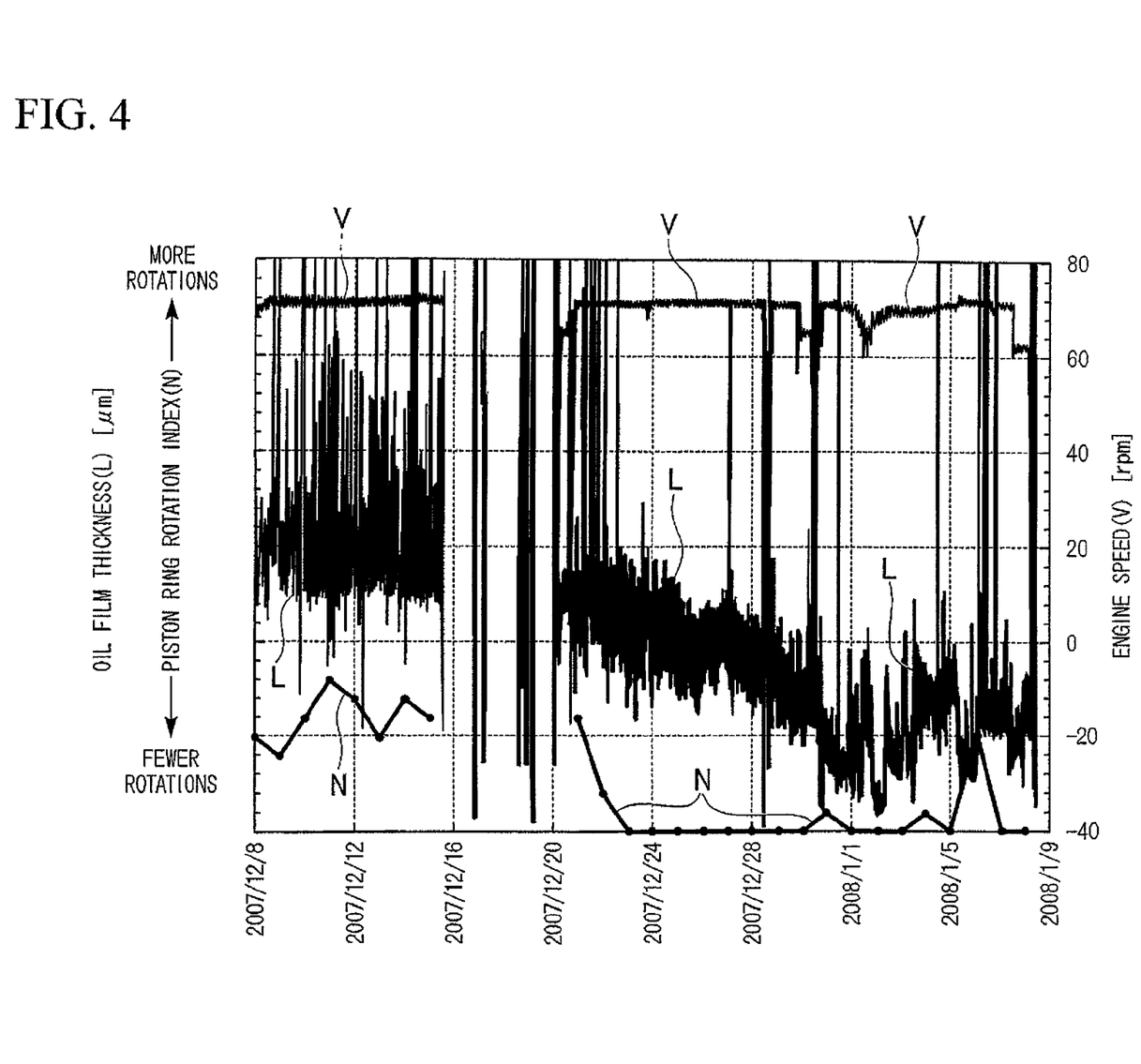
FIG. 4 is a diagram showing a relationship between a thickness of an oil film and a rotation of a piston ring in the embodiment of the present invention.

FIG. 4 is an experiment result showing a relationship among a velocity of the engine S (an engine speed) V, an oil film thickness L of the lubricating oil between the piston ring p1 and the cylinder liner s1, and a piston ring rotation index (an index indicative of the number of rotations of the piston ring p1 per day) N. They were measured over the period of approximately one month from Dec. 8, 2007 to Jan. 9, 2008 (the experiment was suspended from December 16 to December 20). The oil film thickness L in this experiment was measured by a capacitance-type film thickness measurement apparatus. Pulse-like lines in the vertical direction reflect an influence by the fitting clearance A of the piston ring p1.

As shown in FIG. 4, in the period from December 8 to December 16, that is, in a state where the engine S is operated at the specified engine speed V and the oil film thickness L is sufficiently secured, the piston ring rotation index N indicates comparatively large values. In contrast to this, in a state where the oil film thickness L is relatively small while, as is the case for December 20 and later, the engine speed V is substantially similar in value to that in the period from December 8 to December 16, the piston ring rotation index N is more decreased compared with that in the period from December 8 to December 16. That is, the piston ring p1 rotates favorably in the case where the oil film thickness L is sufficient. On the other hand, as the oil film thickness L becomes thinner, the piston ring p1 rotates more and more slowly and stops in the end.

In this manner, the rotation of the piston ring p1 has a correlation with the oil film thickness L of the lubricating oil. Therefore, measuring the rotation of the piston ring p1 instead of measuring the oil film thickness L enables detection of a sign of a production of burning of the engine S resulting from thinning of the oil film thickness L. Furthermore, it is possible to detect the rotation of the piston ring p1 as a rotation of the fitting clearance A, as shown in FIG. 3.

That is, in the apparatus for monitoring a sliding state of a piston ring according to the present invention, the temperature data collection portion 3 collects and stores the temperature data shown in FIG. 3 for the temperature sensors 1a, 1b, 1c, and 1d. Then, based on the temperature data on the temperature sensors 1a, 1b, 1c, and 1d that is stored in the temperature data collection portion 3, the piston ring rotation state determination portion 4 detects a cycle in which the highest temperature is generated (that is, the cycle of rotation of the fitting clearance A).

As shown in FIG. 3, in the detection result of each of the temperature sensors 1a, 1b, 1c, and 1d, the highest temperature appears regularly with the passage of the fitting clearance A. On the other hand, the piston ring rotation state determination portion 4 acquires a cycle in which the highest temperature is generated for each of the temperature sensors 1a, 1b, 1c, and 1d, and regards their average value as a cycle of rotation of the fitting clearance A. Furthermore, the piston ring rotation state determination portion 4 determines whether this cycle of rotation is not more than a predetermined threshold value or not, so that the piston ring rotation state determination portion 4 detects a sign of burning of the engine S. At this time, if the cycle of generation of the highest temperature is not more than the threshold value, the piston ring rotation state determination portion 4 concludes that there is a sign of burning in the engine S, and outputs an alarm to the outside.

As has been described above, according to the present embodiment, the cycle of rotation of the fitting clearance A is detected based on the temperature data on the temperature sensors 1a, 1b, 1c, and 1d so that a sign of burning of the engine S is determined. Therefore, it is possible to detect a sign of burning of the piston by a method less expensive and simpler than conventional methods.

The present invention is not limited to the above embodiment. For example, modifications as follows are conceivable.
(1) While the four temperature sensors 1a, 1b, 1c, and 1d are provided in the above embodiment, the number of the temperature sensors may be other than four.
(2) While the four temperature sensors 1a, 1b, 1c, and 1d are provided in one cross-section orthogonal to the reciprocating direction of the piston P in the above embodiment, temperature sensors may be provided in a plurality of cross-sections orthogonal to the reciprocating direction of the piston P.
(3) While the position of the fitting clearance A is detected, to thereby detect the rotation of the piston ring p1 in the above embodiment, the present invention is not limited to this. The rotation of the piston ring p1 may be detected by another method.

INDUSTRIAL APPLICABILITY

The present invention detects a rotation of a piston ring based on a temperature at a predetermined site of a cylinder liner, and determines a sign of burning of a piston based on a state of the rotation. As a result, it is possible to detect a sign of burning of a piston by an apparatus less expensive than apparatuses using a conventional technique of detecting a capacitance.

DESCRIPTION OF THE REFERENCE SYMBOLS 1a, 1b, 1c, 1d: temperature sensor, 2: rotary encoder (rotation sensor), 3: temperature data collection portion, 4: piston ring rotation state determination portion, S: engine, P: piston, p1: piston ring, s1: cylinder liner

The invention claimed is:
1. An apparatus for monitoring a sliding state of a piston ring, comprising:
   a temperature sensor that detects a temperature at a predetermined site of a cylinder liner;
   a rotation sensor that detects a rotation of an engine;
   a temperature data collection portion that obtains, based on detection result of the rotation sensor, only temperature data on the predetermined site when a piston ring passes on the predetermined site from a detection result of the temperature sensor; and
   a piston ring rotation state determination portion that detects a rotation of the piston ring based on the temperature data and determines a sign of burning of a piston based on a state of the rotation.

2. The apparatus for monitoring a sliding state of a piston ring according to claim 1, comprising:
- a plurality of temperature sensors in a cross-section orthogonal to a reciprocating direction of the piston, wherein
- the piston ring rotation state determination portion detects a rotation of the piston ring based on an average value of pieces of temperature data on the temperature sensors.

3. The apparatus for monitoring a sliding state of a piston ring according to claim 2, wherein
- the piston ring rotation state determination portion acquires a cycle of varying temperature based on the temperature data and detects the cycle as a cycle of rotation of the piston ring.

4. The apparatus for monitoring a sliding state of a piston ring according to claim 1, wherein
- the piston ring rotation state determination portion acquires a cycle of varying temperature based on the temperature data and detects the cycle as a cycle of rotation of the piston ring.

5. A method for monitoring a sliding state of a piston ring, comprising:
- a temperature detection step with a temperature sensor that detects a temperature at a predetermined site of a cylinder liner;
- an engine rotation detection step with a rotation sensor that detects a rotation of an engine;
- a temperature data collection step with a temperature data collection portion that collects, based on a detection result of the rotation of the engine, only temperature data on the predetermined site when a piston ring passes the predetermined site from the detection result of the temperature;
- a piston ring rotation detection step with a piston ring rotation state determination portion that detects a rotation of the piston ring based on the temperature data; and
- a determination step with the piston ring rotation state determination portion that determines a sign of burning of a piston based on a detection result of the rotation of the piston ring.

6. The method for monitoring a sliding state of a piston ring according to claim 5, wherein
- the temperature detection step detects temperatures at a plurality of sites in a cross-section orthogonal to a reciprocating direction of the piston,
- the temperature data collection step acquires temperature data on the plurality of sites; and
- the piston ring rotation detection step detects a rotation of the piston ring based on an average value of the temperature data.

7. The method for monitoring a sliding state of a piston ring according to claim 6, wherein
- the piston ring rotation detection step acquires a cycle of varying temperature based on the temperature data obtained in the temperature data collection step, and detects the cycle as a cycle of rotation of the piston ring.

8. The method for monitoring a sliding state of a piston ring according to claim 5, wherein
- the piston ring rotation detection step acquires a cycle of varying temperature based on the temperature data obtained in the temperature data collection step, and detects the cycle as a cycle of rotation of the piston ring.

* * * * *

UNITED STATES PATENT AND TRADEMARK OFFICE
CERTIFICATE OF CORRECTION

PATENT NO. : 8,429,958 B2  Page 1 of 1
APPLICATION NO. : 13/000781
DATED : April 30, 2013
INVENTOR(S) : Saito et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 91 days.

Signed and Sealed this
Eighth Day of September, 2015

Michelle K. Lee
*Director of the United States Patent and Trademark Office*